Dec. 18, 1928.   S. HELFGOTT   1,695,427
PEROGEN DOUGH CUTTING AND TRIMMING TOOL
Filed Nov. 15, 1926
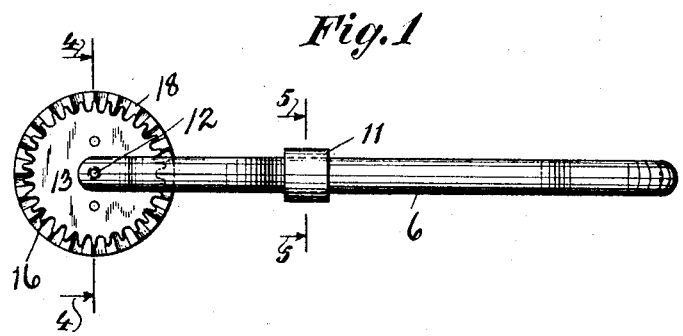
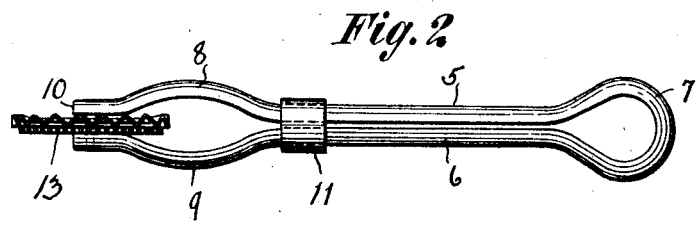
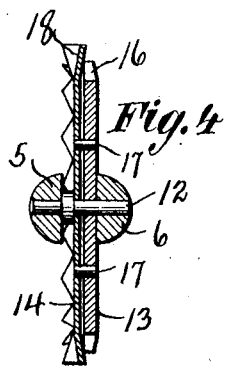
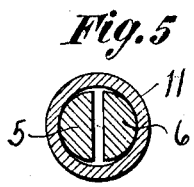
INVENTOR
S. HELFGOTT
BY HIS ATTORNEY
Aaron L. Applebaum Patented Dec. 18, 1928.

1,695,427

UNITED STATES PATENT OFFICE.

SOLOMON HELFGOTT, OF NEW YORK, N. Y.

PEROGEN DOUGH CUTTING AND TRIMMING TOOL.

Application filed November 15, 1926. Serial No. 148,391.

This invention relates to a dough cutting and trimming instrument and more particularly to a novel and improved tool for shaping the edges in the preparation of cakes, cookies and pastry in general.

One of the objects of my invention is to provide a novel and improved dough cutting and trimming instrument or tool adapted to simultaneously trim and produce a closely cut corrugated edge as required in the preparation of different forms of fancy pastry.

Another object of my invention is to provide a pastry cutting and trimming tool or instrument embodying two discs constructed and arranged to be clamped on a handle and easily detached therefrom whereby they may be easily cleaned.

A further object of my invention is to provide in a cutting and trimming tool for dough employed in making different forms of pastry, cakes, cookies and the like, including a pair of rotatable disks detachably connected to each other and removably mounted on the end of a handle whereby all of the parts of the tool or instrument may be dissembled for cleaning purposes.

The term "perogen" is used by bakers to indicate a certain design or cut for pastry, being common and well known in and about the New York metropolitan district and particularly on the East Side.

To enable others skilled in the art to more fully comprehend the underlying features of my invention that they may embody the same in the practical advantages for the uses and purposes intended, drawings depicting a preferred form have been annexed hereto in which Fig. 1 is a side view of the tool or instrument.

Fig. 2 is a plan.

Fig. 3 is a plan showing the manner of mounting the discs.

Fig. 4 is a sectional view taken on the line 4—4 of Fig. 1.

Fig. 5 is a sectional view taken on the line 5—5 of Fig. 1.

Fig. 6 is a perspective view showing the edge of the piece of dough when cut and trimmed by the above tool.

Referring now to the drawings, 5, 6 designate the complementary arms of a strip of spring metal integrally connected by a loop 7 at one end and forming a handle.

The perspective arms are bowed outwardly as at 8, 9, the ends 10 continuing in substantial alignment with the body of the handle and adapted to support therebetween the cutting and trimming discs. The arms are adapted to be clamped together by a sliding sleeve 11.

One of the said arms is provided with a pin 12 adjacent its outer end and on which the discs 13, 14 are rotatably mounted, said pin passing through central openings in said discs and through an opening 15 in the end of the opposite and complementary arm.

The disc 13 is somewhat smaller in diameter than the disc 14 being provided with peripheral teeth 16 and diametrically opposed pins 17 which enter similarly located apertures or openings in the disc 14 thus locking said discs together and in contact therewith. The disc 14 is further provided with a fluted edge 18 which cuts or trims the edge of the dough producing a corrugated edge 19 as shown by Fig. 6 of the drawing.

In the actual use and application of the tool or instrument in the preparation of various forms of pastry, cookies etc., a filling is placed between two layers of dough and the edge is to be trimmed and cut. While the outer fluted edge disc 14 cuts and produces a corrugated edge as shown, the inner toothed disc presses downwardly on the two layers of dough so that they adhere to each other sealing the filling. A closely cut and trimmed edge piece of pastry is thus produced when baked.

It will also be appreciated that some flour and dough may adhere or become incrustated on the discs and handle and consequently the tool or instrument will require cleaning from time to time. By sliding the sleeve outwardly toward the end of the handle, the inherent resiliency of the metal comprising the handle will cause the same to spread or separate, as shown by Fig. 3 whereupon the two discs 14, 14 may be removed from the pivot pin. The discs themselves may be separated and cleaned and subsequently replaced in the manner well understood.

Having shown and described my invention what I claim as new and desire to secure by Letters Patent is:

A dough cutting and trimming tool of the class described comprising a handle formed by two spring arms of metal integrally connected at one end, said arms being bowed outwardly at a point adjacent the opposite end of the handle, a pivot pin carried at the inner end of one of the arms and adapted to be locked in an aperture in the end of the opposite arm, a pair of discs rotatably mounted on said pin, one of said discs having a fluted edge and the second disc being of a smaller diameter than the first mentioned disc and provided with a toothed periphery, locking pins for detachably connecting said discs and a clamping sleeve for locking said discs as a unit on the pivot pin at the end of said arms.

In testimony whereof I affix my signature.

SOLOMON HELFGOTT.